(12) United States Patent
Martin

(10) Patent No.: US 9,275,254 B2
(45) Date of Patent: Mar. 1, 2016

(54) AUGMENTED REALITY SYSTEM FOR PUBLIC AND PRIVATE SEMINARS

(75) Inventor: David Martin, Natick, MA (US)

(73) Assignee: FMR LLC, Boston, MA (US)

( * ) Notice: Subject to any disclaimer, the term of this patent is extended or adjusted under 35 U.S.C. 154(b) by 130 days.

(21) Appl. No.: 13/325,325

(22) Filed: Dec. 14, 2011

(65) Prior Publication Data

US 2012/0242695 A1   Sep. 27, 2012

Related U.S. Application Data

(60) Provisional application No. 61/466,143, filed on Mar. 22, 2011.

(51) Int. Cl.
| | |
|---|---|
| *G09G 5/00* | (2006.01) |
| *G06F 21/62* | (2013.01) |
| *G06T 19/00* | (2011.01) |
| *G09C 5/00* | (2006.01) |
| *G11B 27/28* | (2006.01) |
| *G11B 27/32* | (2006.01) |
| *G06F 21/42* | (2013.01) |
| *H04N 7/15* | (2006.01) |
| *H04N 21/41* | (2011.01) |
| *H04N 21/414* | (2011.01) |

(52) U.S. Cl.
CPC ............ *G06F 21/6245* (2013.01); *G06F 21/42* (2013.01); *G06T 19/006* (2013.01); *G09C 5/00* (2013.01); *G11B 27/28* (2013.01); *G11B 27/322* (2013.01); *G06F 2221/032* (2013.01); *H04L 2209/56* (2013.01); *H04N 7/15* (2013.01); *H04N 21/4122* (2013.01); *H04N 21/41407* (2013.01); *H04N 21/41415* (2013.01)

(58) Field of Classification Search
CPC .......... G09G 5/00; G06Q 40/00; H04N 21/00
See application file for complete search history.

(56) References Cited

U.S. PATENT DOCUMENTS 6,963,898 B2 * 11/2005 Yoshimine et al. ........... 709/203
7,053,916 B2   5/2006 Kobayashi et al.
(Continued)

FOREIGN PATENT DOCUMENTS

WO   WO2007/010416   1/2007

OTHER PUBLICATIONS

Notification of International Search Report and Written Opinion for corresponding Application No. PCT/US12/29916, dated Jul. 13, 2012; pp. 1-14.

*Primary Examiner* — James A Thompson
*Assistant Examiner* — Tapas Mazumder
(74) *Attorney, Agent, or Firm* — Fish & Richardson P.C.

(57) ABSTRACT

Described are computer implemented augmented reality techniques for public and private seminars that includes receive an indication of a start of a segment of a live presentation, the live presentation comprising at least one segment, with the at least one segment having at least one presentation component; receive information related to a plurality of users, receive rules to analyze the information and select from the information, private information pertaining to a particular user, with the selected information being relevant to the at least one presentation component of the at least one segment of the live presentation, generate an image that when rendered on a display device renders the private information pertaining to the particular user for that presentation component, and send the image of the private information to a device associated with the particular user.

32 Claims, 8 Drawing Sheets

(56) References Cited

U.S. PATENT DOCUMENTS

| | | | |
|---|---|---|---|
| 7,337,325 B2 | 2/2008 | Ikegami et al. | |
| 7,779,450 B2 | 8/2010 | Ohmori | |
| 2003/0061369 A1* | 3/2003 | Aksu et al. | 709/231 |
| 2008/0066080 A1* | 3/2008 | Campbell | 719/314 |
| 2009/0006271 A1* | 1/2009 | Crowder | 705/36 R |
| 2009/0187817 A1* | 7/2009 | Ivashin et al. | 715/230 |
| 2011/0018903 A1 | 1/2011 | Lapstun et al. | |
| 2011/0119058 A1* | 5/2011 | Berard et al. | 704/235 |
| 2011/0270135 A1* | 11/2011 | Dooley et al. | 600/595 |
| 2012/0204231 A1* | 8/2012 | Holtmanns et al. | 726/3 |

* cited by examiner

AUGMENTED REALITY SYSTEM FOR PUBLIC AND PRIVATE SEMINARS

This application claims priority under 35 U.S.C. §119 to U.S. Provisional Patent Application Ser. No. 61/466,143, filed Mar. 22, 2011, and entitled "Augmented Reality System for Public and Private Seminars", the entire contents of which are hereby incorporated by reference.

BACKGROUND

This invention relates to tools to conduct seminars and other group activities.

Seminars are used by organizations to present to users information for various purposes such as to sell goods/services, answer questions, and/or provide information about a service. Examples include financial seminars. One particular example is a public seminar conducted by financial services firms for individuals. A public seminar generally uses generic, non-private information that is displayed to all of the users attending the seminar, such that the attendees view slides or other information, presented during the seminar, populated with the generic non-private information, so that the information can be displayed to all of the users attending the seminar. In order for a user to view the user's private information, the user engages in an off-line or side conversation in a one-to-one consultation with a financial services firm's representative to review the user's private information that the firm may have with the user.

SUMMARY

According to an aspect, a system includes one or more computer systems configured to receive an indication of a start of a segment of a live presentation, the live presentation comprising at least one segment, with the at least one segment having at least one presentation component, receive information related to a plurality of users, receive rules to analyze the information and select from the information, private information pertaining to a particular user, with the selected information being relevant to the at least one presentation component of the at least one segment of the live presentation, generate an image that when rendered on a display device renders the private information pertaining to the particular user for that presentation component and send the image of the private information to a device associated with the particular user.

According to an additional aspect, a computer implemented method includes receiving by one or more computer systems an indication of a start of a segment of a live presentation, the live presentation comprising at least one segment, with the at least one segment having at least one presentation component, receiving by one or more computer systems information related to a plurality of users, analyzing by one or more computer systems the information to select from the information, private information pertaining to a particular user, with the selected information being relevant to the at least one presentation component of the at least one segment of the live presentation, generating by one or more computer systems an image that when rendered on a display device renders the private information pertaining to the particular user for that presentation component, and sending the image of the private information to a device associated with the particular user.

According to an additional aspect, a computer program product tangibly stored on one or more computer-readable storage devices includes instructions that are executable by the one or more processing devices to receive an indication of a start of a segment of a live presentation, the live presentation comprising at least one segment, with the at least one segment having at least one presentation component, receive information related to a plurality of users, receive rules to analyze the information and select from the information, private information pertaining to a particular user, with the selected information being relevant to the at least one presentation component of the at least one segment of the live presentation, generate an image that when rendered on a display device renders the private information pertaining to the particular user for that presentation component, and send the image of the private information to a device associated with the particular user.

The above techniques can include additional features. The techniques involve analyze the information to select private information of each of a plurality of users including the particular user, that are relevant to the at least one presentation component of the at least one segment of the live presentation, generate corresponding images that when rendered on display devices of the plural users renders the private information pertaining to each of the users including the particular user for that presentation component, and send the images to devices associated with the users including the device of the particular user. The techniques include generate the live presentation comprising the at least one segment, with the at least one segment having the at least one presentation component, populated with public information; and augment the image of the private information with an image of the public information, with the image of the public information in juxtaposition with the image of the private information.

The above techniques include a display device configured to receive the generated image. The display device configured to receive the generated image is physically remote from the one or more computer systems. The display device is a set of eyeglasses comprising a pair display device elements, the eyeglasses configured to receive the generated image. The display device is a set of eyeglasses comprising a pair display device elements, the eyeglasses configured to receive the generated image over a wireless connection. The techniques further include a portable computing system including a wireless connection configured to receive the generated image and a set of eyeglasses comprising a pair display device elements, the eyeglasses configured to receive the generated image over the wireless connection of the portable computing system. The techniques receive, from the computer system associated with the particular user, information uniquely identifying the particular user as authenticated to access at least a portion of private information included in the information feeds, verify, based on the information uniquely identifying the particular user, that the particular user is authenticated to access the portion of the private information and establish a secure connection between a device associated with the particular user and the one or more computer systems, with the private information sent to the device of the particular user over the secure connection. The techniques generate a pictorial representation of a physical display board and integrate the image of the private information with the pictorial representation of the physical display board. The techniques further include receive from computer systems associated users at a public seminar, requests for images of private information of the users and send to the computer system associated with the users images of the private information corresponding to the users, with the computer systems receiving only images of private information corresponding to a particular user that has been authenticated to receive the private information. The techniques further include generate a plurality of independent information feeds comprising generated images, each feed comprising private information related to one of a plurality of users and presentation information associated with the presentation component of the live presentation.

DESCRIPTION OF DRAWINGS

The accompanied figures are to be used in conjunction with the description below.

FIG. 7A is a picture of a typical user device.

The details of one or more embodiments of the invention are set forth in the accompanying drawings and the description below. Other features, objects, and advantages of the invention will be apparent from the description and drawings, and from the claims

DETAILED DESCRIPTION

Through a computer system (not shown), a seminar leader, i.e., presenter conducts a public seminar. Typically, the presenter displays for users in attendance at the public seminar a presentation that comprises a series of presentation components, such as slides and/or pre-recorded text, images, etc. that are supplemented with live explanations by the presenter. The presenter navigates among different segments of the seminar. The presenter generates "trigger events," either prior to or while conducting the seminar. These trigger events are produced using a user interface device (e.g., a mouse, a keyboard, remote control device, and so forth) that is configured to cause the computer system to display a next slide or other material. Typically, a number of users will attend the public seminar. Information on the slide is generic non-private information.

In some embodiments, the seminar is recorded and the computer system stores the recorded public seminar. The computer system also records a time corresponding to each trigger event. In particular, the computer system records an amount of time that has elapsed from when the public seminar began to the occurrence of each trigger event. Alternatively, the computer system records the number of trigger events and the order in which the slides were presented in relation to the trigger events.

Figure 1:
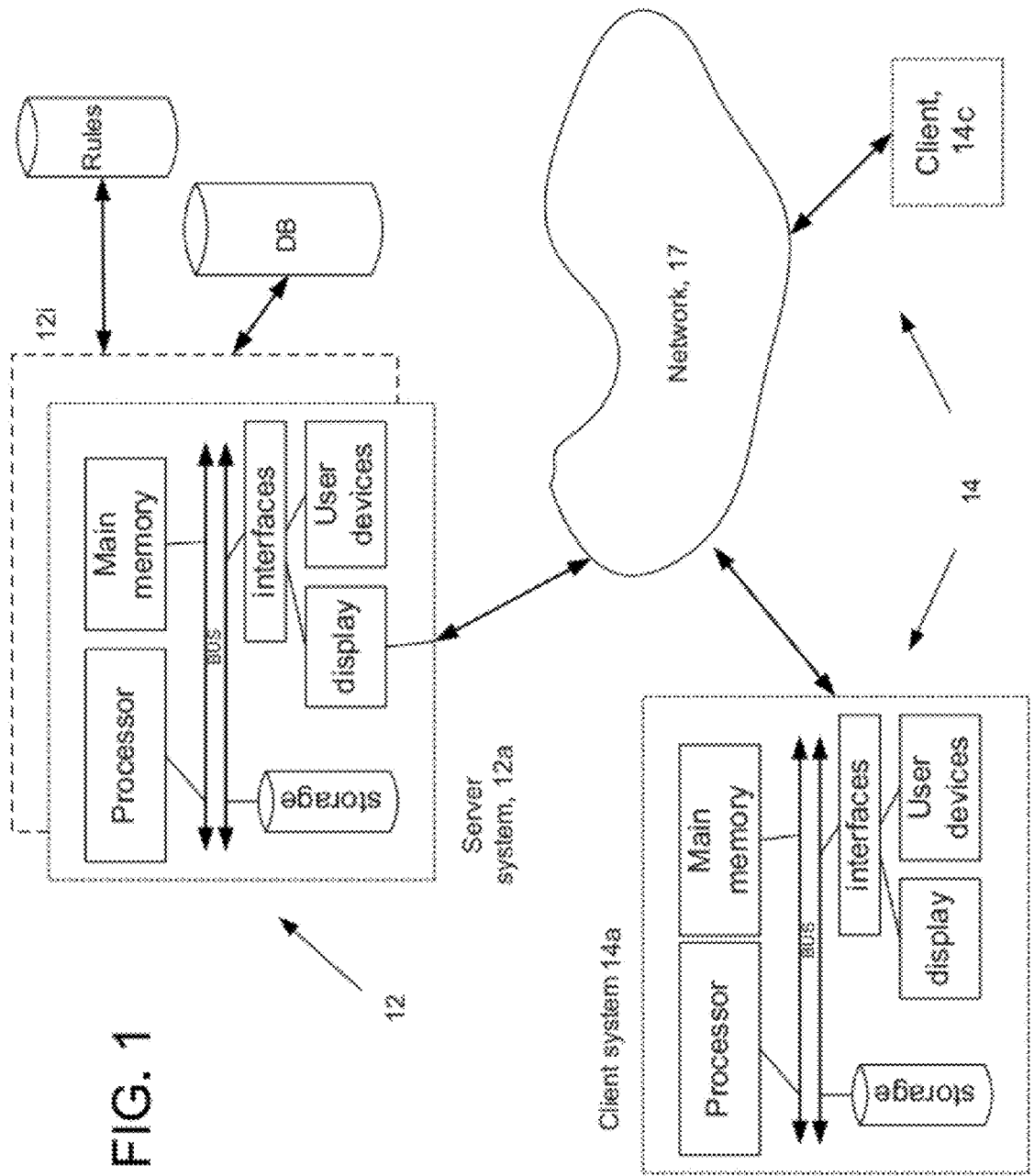
FIG. 1 is a block diagram.

Referring now to FIG. 1, a system 10 includes a server type of system 12 comprised of one or more computer systems 12*a*-12*i*, each computer system 12*a*-12*i* including a processor, memory and computer storage that stores a computer program product. The system 10 augments the presentation to enable users to view private information while in a public setting such as the seminar, as the seminar is being conducted. When executed, the computer program product configures the server 12 to send a plurality of independent information feeds or message streams from the server 12 to a plurality of client devices generally 14. The information feeds are received over a network 17, which can be wired or wireless, and, which may include the Internet and/or private networks and typically will involve secure connections. The server 12 produces the independent information feeds 14 during the seminar pertaining to different users at each of the client systems 14. The server produces these independent information feeds using extracted private information obtained from external sources, such as database 18 using a rules engine that executes rules 19.

Figure 2:
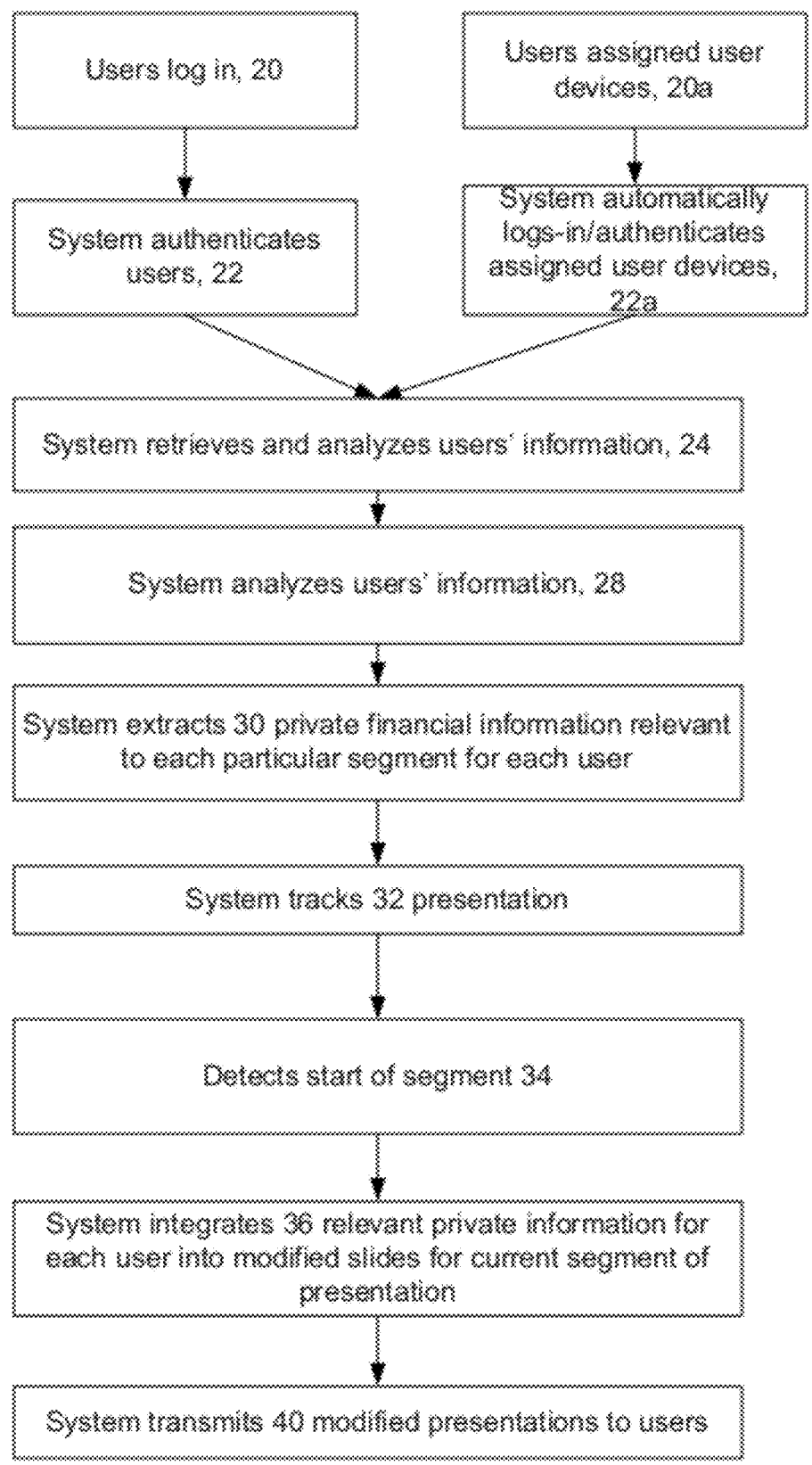
FIG. 2 is a flow chart depicting an embodiment of the augmentation.

Referring now to FIG. 2, a user logs 20 into system 10, typically by accessing a web page on the Internet, or as alternative log in procedure, the user is assigned 20*a* a device and the user's device is automatically logged-in/authenticated 22*a* when the user device is turned on. This alternative procedure is particularly useful for certain embodiments as will be discussed below.

After supplying requested credentials to authenticate 22 the users (or authenticate 22*a* the users' devices) as owners of one or more account(s) at the financial services firm, the system 10 establishes a secure connection between the user's device associated with the particular user and the computer system 10, with the private information sent to the device of the particular user over the secure connection, so that the system 10 can retrieve 24 the private information from each of the users' accounts.

In an example, the system 10 verifies that each of the users is authenticated to view private information when the user logs into the system. In this example, the users access the system via the client devices, generally 14, by accessing a graphical user interface (not shown) generated by the system 10 and inputting into the graphical user interface information that uniquely identifies the users as customers of the financial institution. The system 10 retrieves 24 the private financial information corresponding to the users that logged in or were automatically logged in, and processes/analyzes 28 this information to determine which private information is associated with the customer and which private information the customer is authenticated to view.

For users that do not have any relevant accounts these users can still attend the seminar and can still view the seminar, either live or through a user device, but these users will be fed information streams that contain generic non-private data.

Still referring to FIG. 2, the system extracts 30 for each of the logged in users, private information corresponding to a particular segment and particular slide of the segment based on a particular trigger event. The system 10 tracks 32 when a new segment of the presentation begins, for example, by determining an occurrence of a trigger event or lapsed time. When the system detects 34 the start of a new segment, the system 10 integrates 36 extracted private financial information relevant to the segment into an instance of the slide. The system 10 integrates this extracted private information into the instance of a slide that is part of the segment in the presentation and sends 40 the slide having the integrated private information to the user's client device 14*a*. This process is provided for each logged in user that has relevant private information. With each logged in user that has relevant private information receiving its own corresponding version of the slide with its own private information.

The server computer generates the slide which when rendered on the user's client system 14*a* enables the user to view its private information while the user is attending the public seminar. In some embodiments, the image corresponds in form to an image that the presenter displays as part of the seminar, except that the generated image contains the user's private information instead of generic information in the image displayed by the presenter.

That is, the system retrieves information pertaining to user data for all users in attendance at the seminar and processes that the information through the rules engine using rules 19 that examines various factors to assemble user data for each of the users attending the public seminar.

The rules engine processes the information feed or a portion of the feed for each user to segregate the private information for a particular user and to filter and/or assemble information based on a particular segment of the presentation. The output of the rules engine thus includes the private information for which a particular user has been authenticated to view, the private information in some embodiments, determined or selected based on, e.g., a segment of the seminar.

Figure 3:
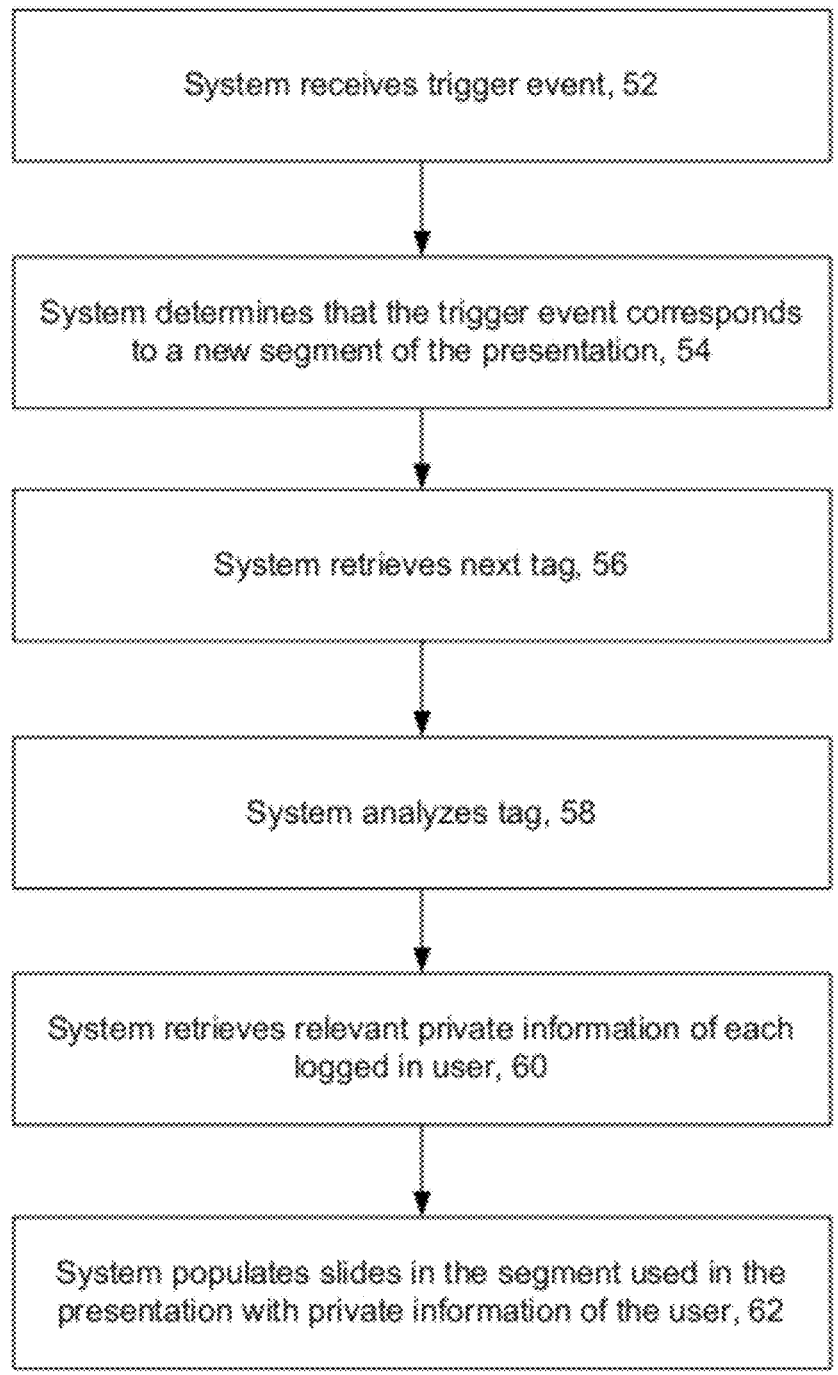
FIG. 3 is a flow chart depicting an example of generating segments.

Referring now to FIG. 3, an example of generating 36 the segments of the presentation based on a tag indicative of a topic of the segment is shown. Segments can include, e.g., retirement investing, growth investing, mutual fund investing, and so forth. The tag has information that specifies what types of data should be associated with each segment. For example, the tag could point to a structure that specifies data elements to be included within a modified segment of the presentation to populate one or more slides used in the presentation.

The system receives 52 a corresponding trigger event. When the system 10 determines 54 that a new segment of the presentation is about to start, the system 10 retrieves 56 the next tag and analyzes 58 the tag associated with the upcoming segment to determine the topic associated with the segment and the data needed for that topic. Using the topic associated with the segment, the system retrieves 60 private information relevant to the segment for each logged in user.

For each logged in user, the system populates 62 slides used in the segment with the private information of that user replacing generic information that is being used by the presenter in the seminar. For those topics or segments (or slides) where users that are customers do not have any relevant private data or for users that are not, e.g., customers, the system will simple populate the slides in the segment with the generic data. For example, one expeditious way to populate the segment is to substitute generic data used in a slide presentation, e.g., PowerPoint® (Microsoft, Inc.) with the private data. With the slides populated being the same slides or at least the same templates of slides used in the presentation.

Figure 4:
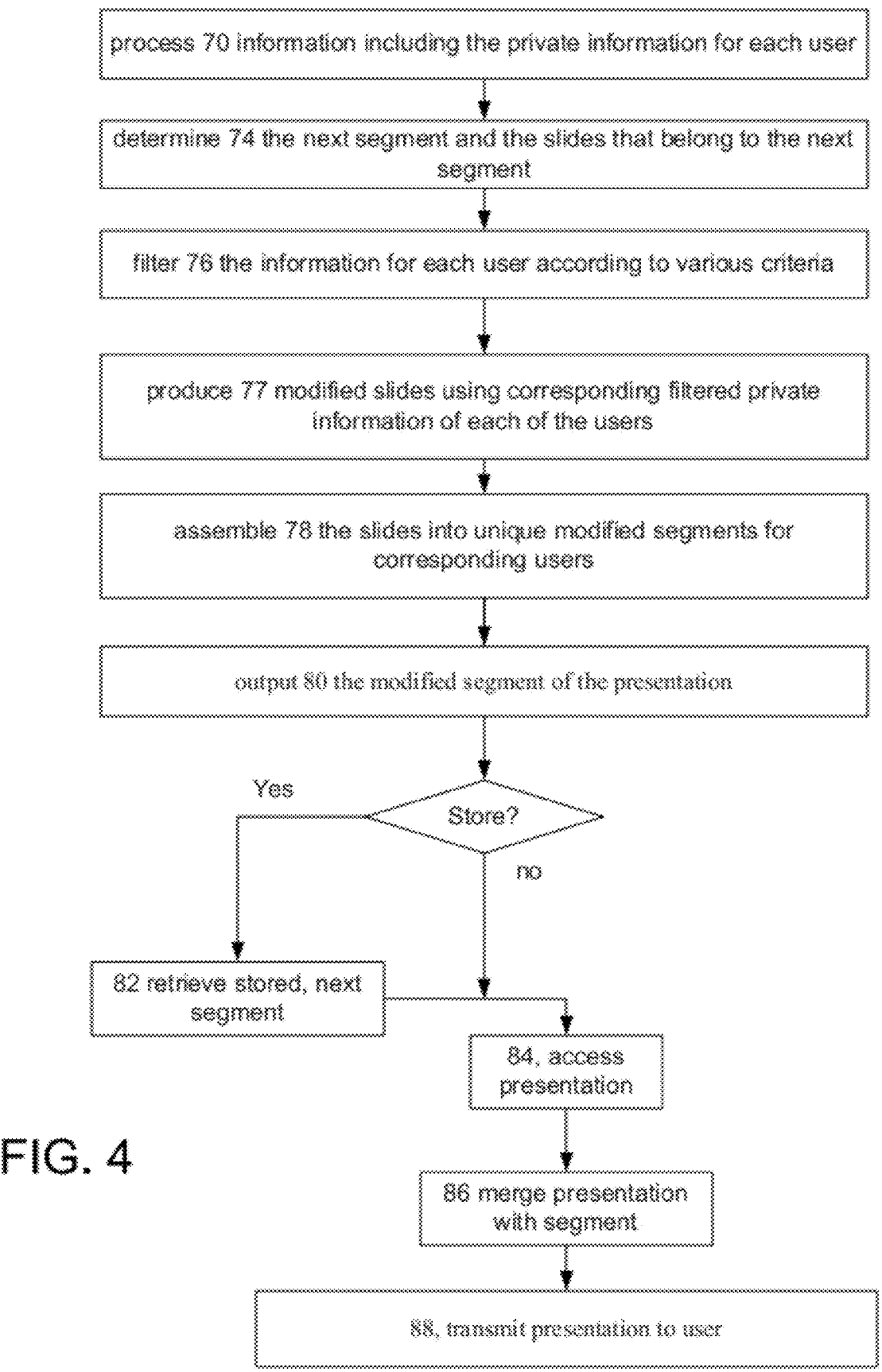
FIG. 4 is a flow chart depicting an example of integrating private data.

Referring now to FIG. 4, an example of integrating 38 the private data with the saved presentation has the rules engine process 70 information including the private information for each logged in user. The rules engine determines 74 the next segment and the slides that belong to the next segment. The rules engine filters 76 the information for each user, according to various criteria including information relevant to the next segment of the presentation, any authentication privileges, and the needed contents of each slide in the segment for inclusion in a modified slide. The system 10 produces 77 a modified slide for each logged in user. The rules engine assembles 78 the modified slides into modified segments of the presentation, with each modified segment associated with a corresponding one of the logged in users. Thus, in general, the system will produce unique segments for logged in users that have relevant private information, and produce or supply generic segments for non-logged in users or for logged in users that do not have any relevant private information. The rules engine outputs 80 all of the unique segments of the presentation either for storage and later transmission or to immediately transmit to the users, with the modified segments of the presentation including the private information for which a particular user has been authenticated to view as determined or selected based on, e.g., a segment of the seminar and/or the tag.

The rules engine either retrieves 82 the saved next segment of the presentation for each user or continues processing of the next segment of the presentation for each user. In some embodiments, the rules engine merges 86 a video image of the live presentation and audio with slides of the modified segment of the presentation, so that the logged in users can view the presentation and also view their private information during the presentation in place of generic information that the presenter is using for the seminar. The rules engine transmits 88 the modified segments having the private information to the corresponding logged in users typically over a secure connection.

Figure 5:
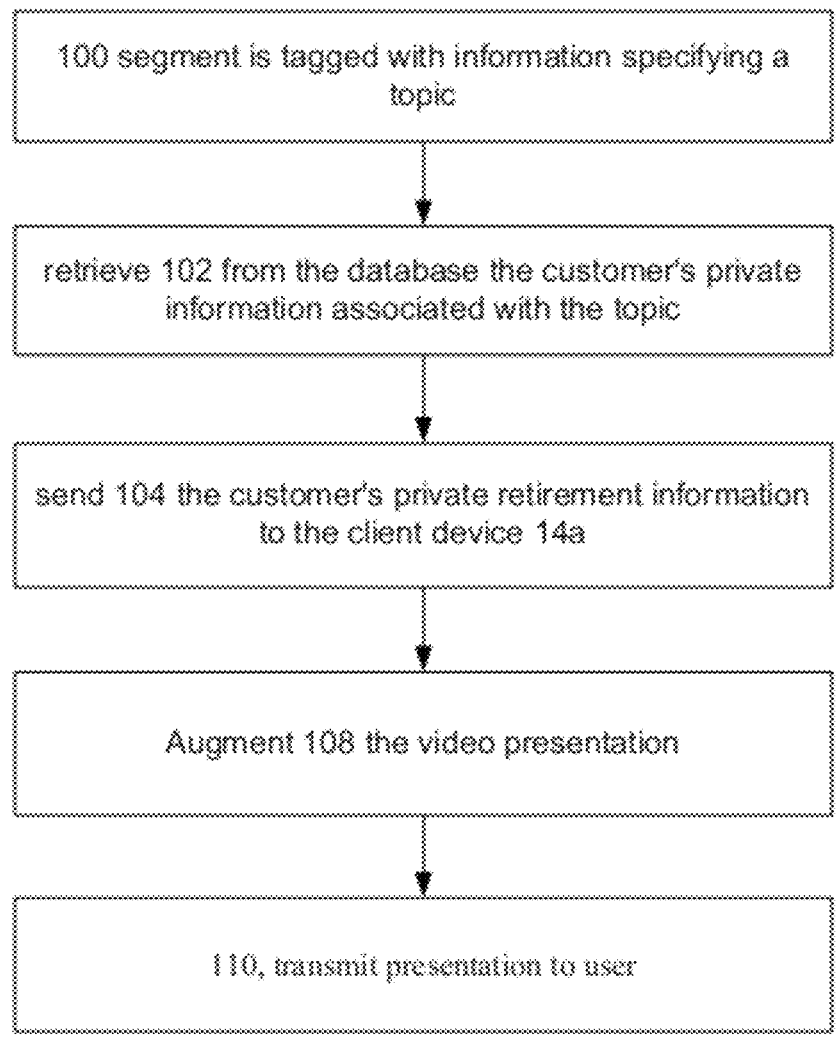
FIG. 5 is a flow chart depicting a specific example.

Referring now to FIG. 5, in an example, a segment of the presentation is tagged 100 with information specifying that the topic of the segment relates to retirement investing. In this example, the system is configured to retrieve 102 from the database the customer's private information that is related to the customer's retirement accounts, including, e.g., 401k accounts, pension accounts, IRA accounts, and so forth. The system 10 is further configured to send 104 the customer's private retirement information to the client device 14a.

This arrangement provides customers an opportunity to view/attend the presentation and be provided with a visual representation of the private information in juxtaposition to a visual representation of the segment of the presentation that follows the occurrence of the trigger event. The presentation is thus augmented 108 with an image of the customer's private information where for those users that are not customers and yet in attendance at the presentation, generic, exemplar account data are presented and transmitted to those non-customer users.

Figure 6:
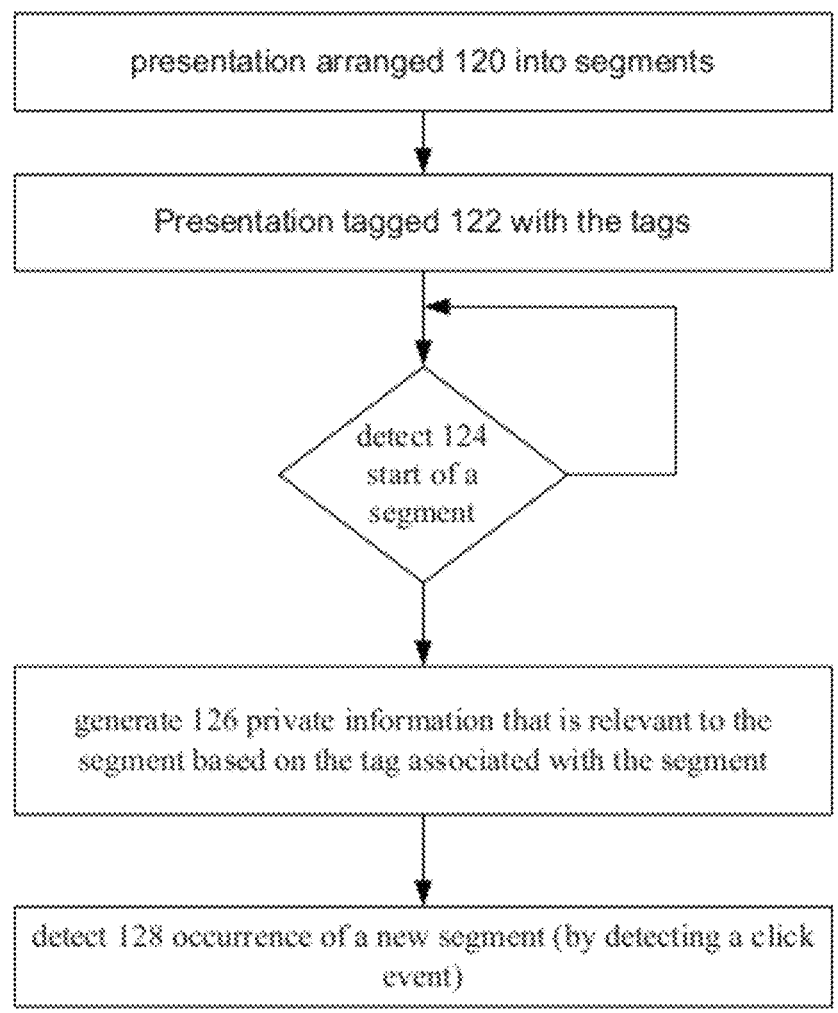
FIG. 6 is a flow chart depicting tagging.

Referring now to FIG. 6, the presentation is prearranged into segments. The segments of the presentation are tagged 122 with the tags defining content of the segment. As the presentation progresses, the system detects 124 a start of a segment for example, by receiving a trigger event. The system generates 126 private information that is relevant to the segment based on the tag associated with the segment, for example, as previously described. As the presentation progresses, the system detects 128 the occurrence of a new segment (by detecting a click event) and in response augments 130 the presentation by inserting a visual depiction of the private information of the customer into the new segment.

Tags correspond to placeholders for personal data of each customer such as charts or tables that are retrieved at run time for the particular customer and such data are overlaid onto streaming content in the presentation making the customer experience a mix of real-time and canned data. For each customer the data that the tags point to are to data for the particular customer. As an example the first tag in the series could be configured to retrieve an "income and expense" chart when the presenter is discussing income and expense. Different instantiations of the chart are populated with data for each of the customers in attendance, making the experience personal for each of the customers.

Figure 7:
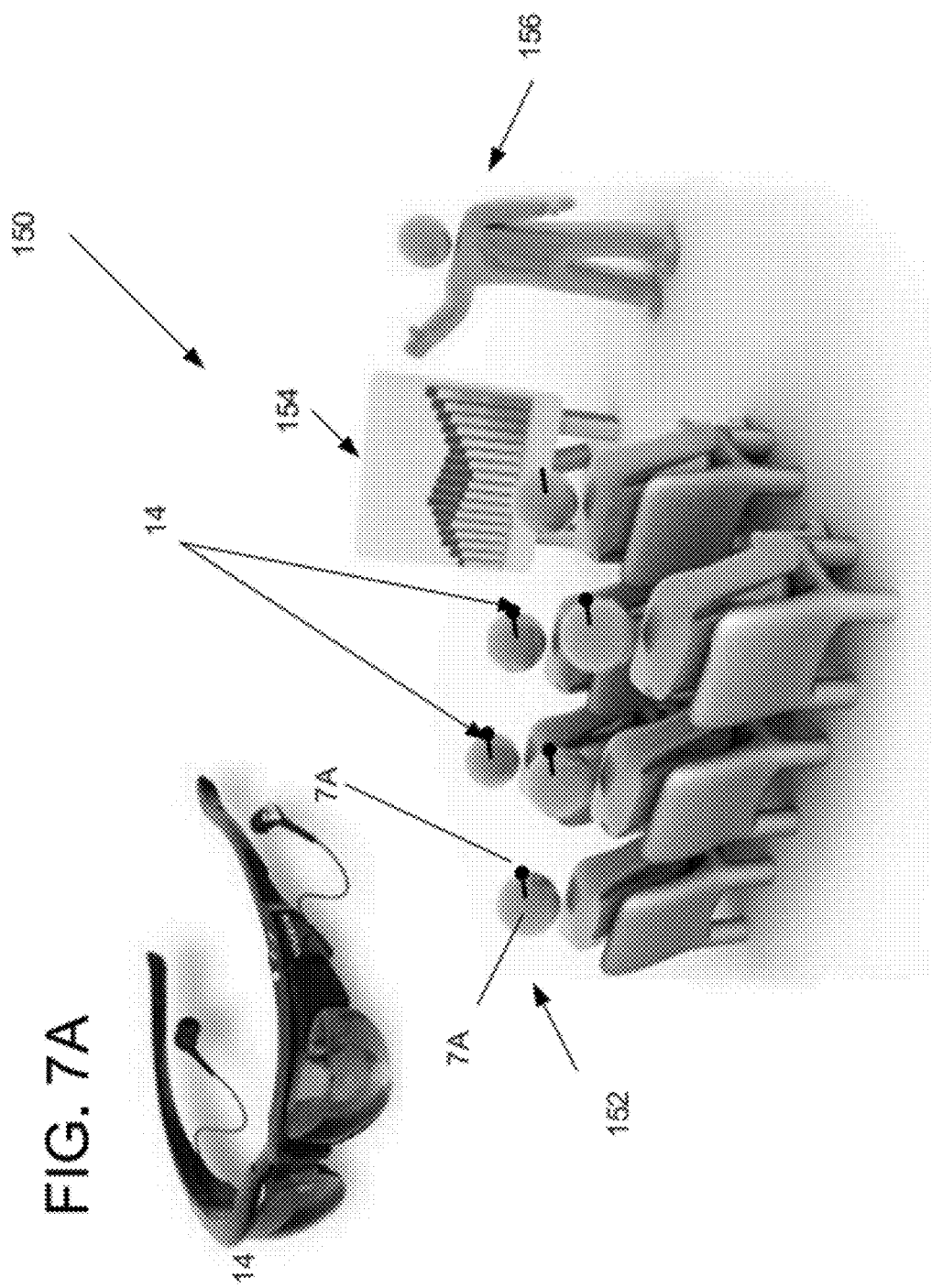
FIG. 7 is a pictorial depiction of a public seminar with plural users privately viewing private information.

Referring now to FIG. 7, an illustrative, pictorial example 150 of the live presentation is shown with an audience 152, graphics depicting generic information 154 and a presenter 156. In FIG. 7, the users in attendance are outfitted with client devices, generally 14. Graphics/images depicting private information associated with each of the users are rendered through each of the corresponding client devices 14. The graphics/imaged depicting the private information are juxtaposed live images of the presenter 156 as the live presentation progresses.

A particular example of a user device that can be used with the alternative log in procedure is shown. A user is outfitted with a display device that is configured to receive the generated image. The display device is configured to receive the generated image, and is physically remote from the one or more computer systems. The display device is a set of eyeglasses that include displays configured to receive the generated image and earphones to hear the presentation. The set of eyeglasses are configured to receive the generated image over a wireless connection. The system includes a portable computing system (not shown in FIG. 7A, but could be one on the client devices of FIG. 1) that receives information from the system 10 and provide processing to generate the image and send the processed image to the set of eyeglasses over a wireless connection with the eyeglasses. The processing provided by the portable computing system can include forming the image from data received from the server.

While eyeglasses can be used as the display device other types of media devices can be configured to receive the generated image, such as personal computers, personal digital assistant devices, tablet computers, etc.

Plural users are in a room attending a financial seminar. In this example, each user uses a computer system to log into the user's financial account. By logging into the financial account, the system verifies that the user is authenticated to view private financial information associated with the user and can view that information over the computer system using either the eyeglasses connected to the system or a display associated with the computer system. The user is provided with a set of eyeglasses. The set of eyeglasses have a wired or wireless connection with the computer system 10.

Alternatively, the set of eyeglasses include a control device through which the user is logged into the computer system 10. In another example, the user uses a separate client device 14 to log into the computer system 10 and the user is separately authenticated with the set of eyeglasses, for example, by entering a security code into a control device of the eyeglasses.

Once the user has been authenticated as authorized to view the private financial information through a particular set of eyeglasses, the user's private financial information is sent the eyeglasses. In this example where there are numerous users in a seminar room, each user receives the user's private financial information and is able to view the private financial information through the set of eyeglasses, for example, during the public seminar. As previously described, the system is configured to send the users' private financial information to the eyeglasses of the users upon detection of a click event in the public seminar. Alternatively, the system can also be configured to send the users' private financial information to the eyeglasses of the users at pre-defined time intervals. In an example, every two minutes, the public seminar progresses to a new segment of the seminar. In this example, the system is configured to send the private financial information to the eyeglasses of the users every two minutes, with the private information determined in accordance with the particular segment.

The private information includes private educational information, private financial information, private medical information, and so forth. In the example of private financial information, the private financial information may include information specifying a user's stock portfolio, a user's financial contribution limits, a user's investment earnings, and so forth. The private information can be rather simple such as merely producing information that when rendered, as discussed below would produce informational depictions of private information. Alternatively, the informational depictions can include statements generated by the rules engine that summarizes the private information.

Through a computer system (not shown) a presenter conducts the seminar for example by running a presentation that displays for the users a series of slides and/or pre-recorded text. The seminar is broken into plural segments. As each segment of the seminar starts, the computer system is configured to generate a request for the image of the private information that is relevant to the particular segment to be sent to the client system associated with the users. In another example, the presenter initiates generation of the request by using a user interface device (e.g., a mouse, a keyboard, a remote control, and so forth) to navigate among the various segments of the presentation. The user interface device generates a message that when processed by the server causes an action, e.g., moving to the next segment, when the presenter selects a button on the user interface device or otherwise performs a predefined action, referred to herein as a "click event." Following detection of a click event, the computer system is configured to generate the request for the image of the private information that is relevant to the particular segment based on the click event to be sent to the computer system associated with the user.

Thus, the computer system 10 is configured to generate, from the plurality of independent information feeds, public information associated with the public seminar, augmented with the private information where the image of the public information is juxtaposed the image of the private information. In particular, the public information includes information that all the users of the seminar may view. In this example, the user's private information is placed side-by-side (e.g., juxtaposed) with the public information in a manner that allows the user to view the private information while also viewing the public information.

Figure 8:
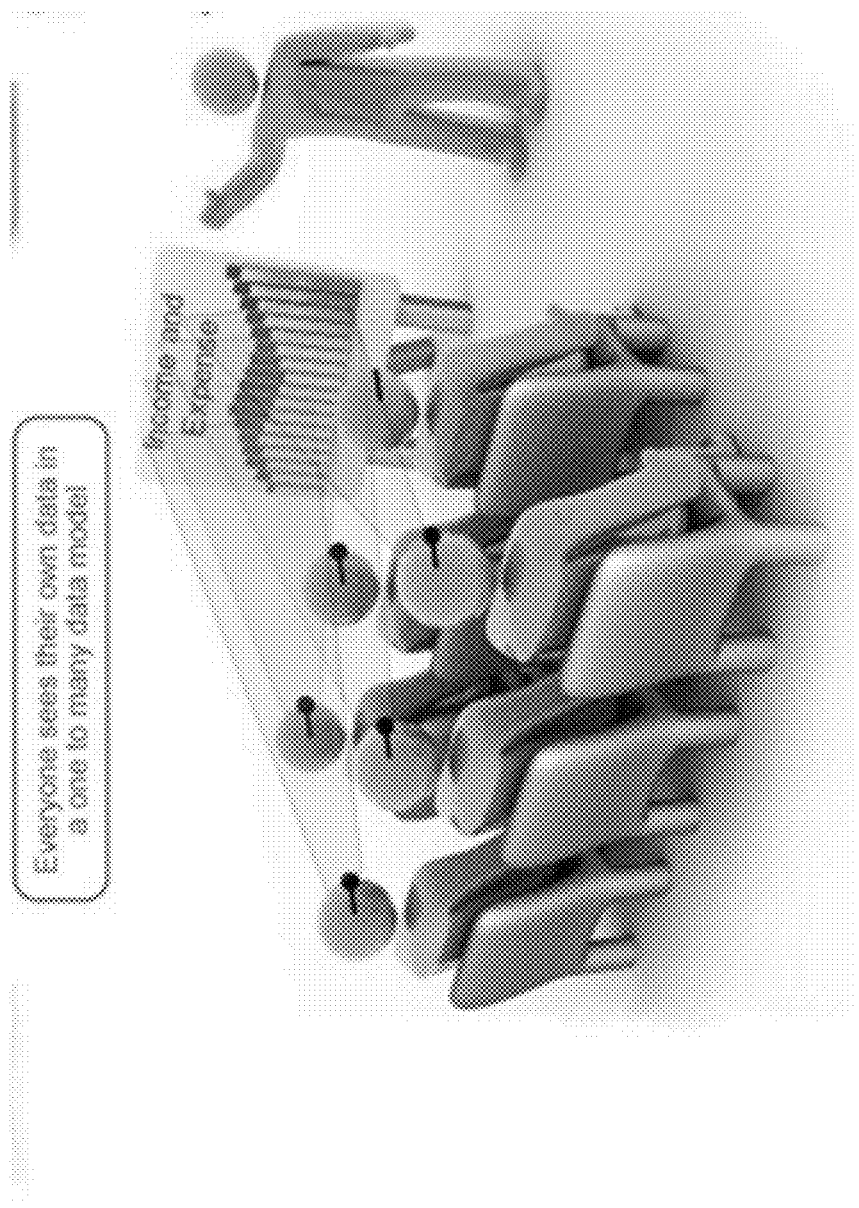
FIG. 8 is another pictorial depiction of a public seminar with users privately viewing private information.

Referring to FIG. 8, in another example, the public seminar includes a physical display board, including, e.g., a chalk board, a bulletin board, a white board, and so forth. To give the user the feel that the user's private information is being displayed on the physical display board, the system is configured to generate an image of the physical display board and to overlay the image of the private information over the image of the physical display board. The image can be a real-world image depicting the physical display board with the private information being displayed, or it can be a morphed or virtual depiction.

A block diagram of components of the system is also shown. User devices can be any sort of computing device capable of taking input from a user and communicating over a network (not shown) with server and/or with other client devices. For example, user device can be a mobile device, a desktop computer, a laptop, a cell phone, a private digital assistant ("PDA"), a server, an embedded computing system, a mobile device, as well as the eyeglasses, and so forth. User devices include monitor which render visual representations.

Exemplary eyeglasses are Wrap 920 VR Bundle from Vuzix Corporation 75 Town Centre Drive Rochester, N.Y. 14623. Such eyeglasses often referred to as video eyewear connects media players or video-out capable mobile phones or a laptop, netbook or desktop PC. Such eyewear typically includes a video eyewear a video e.g., VGA Adapter and tracker. Other examples from Vuzix include The Wrap™ 920AR augmented reality eyewear. Other examples include Z800 Pro AR head mounted display (single or dual VGA input version.) standard or ruggedized distributed by CyberWorld, Inc. 60 De Bresoles Unit 202 Montreal, QC, Canada. In general such eyewear is a wearable display that presents a virtual large screen, stereo video capture, 6-degrees of freedom and head tracking.

Server can be any of a variety of computing devices capable of receiving information, such as a server, a distributed computing system, a desktop computer, a laptop, a cell phone, a rack-mounted server, and so forth. Server may be a single server or a group of servers that are at a same location or at different locations.

Server can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, a information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory, machine-readable media, or other types of non-transitory machine-readable storage devices.

Components also include storage device, which is configured to store information, map, map templates, rules information for the rules, software for the rules engine, etc.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input information and generating output. The invention can be implemented advantageously in one or more computer programs that are executable on a programmable system including at least one programmable processor coupled to receive information and instructions from, and to transmit information and instructions to, a information storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A system comprising:
    one or more computer systems each comprising a processor device and storage, the one or more computer systems configured to:
        receive an indication of a start of a segment of a live presentation, the live presentation comprising at least one segment, with the at least one segment having at least one presentation component;
        retrieve one or more sets of private information associated with at least some of a plurality of users;
        apply rules to extract from a particular set of the retrieved private information associated with a particular user, selected private information of the particular user, which is relevant to the at least one presentation component;
        generate a first version of the presentation component, which is specific to the particular user from a presentation component template and the selected private information of the particular user;
        generate a first image corresponding to the generated first version of the presentation component specific to the particular user, the first version of the image having at least some of the selected private information of the particular user;
        generate a second version of the presentation component, which is for the plurality of users excluding the particular user, from the presentation component template and generic information;
        generate a second image corresponding to the generated second version of the presentation component for the plurality of users excluding the particular user; and
        send the generated first image including the private information to a device associated with the particular user and the generated second image that includes generic information to one or more devices associated with the plurality of users excluding the particular user.

2. The system of claim 1, wherein the system retrieves plural sets including the one set of private information, and the one or more computer systems are further configured to:
    apply the rules to analyze the retrieved, plural sets of private information of plural users that are included in the plurality of users, to select from the plural sets of private information of the plural users including the particular user, information relevant to the at least one presentation component;
    generate plural first versions of the presentation component including the first generated presentation component from the presentation component template each of the plural first versions specific to a corresponding one of the plural users;
    generate corresponding images for each of the plural versions of the first presentation component for the plural users with each one of the corresponding image populated with the private information pertaining to a corresponding one of the plural users, and for remaining users of the plurality of users, the images populated with generic non-private, fill in information for that presentation component; and
    send the generated images to devices associated with the plurality of users.

3. The system of claim 1, wherein the one or more computer systems are further configured to:

receive from a video recording device images captured from the live presentation;

store the received images captured from the live presentation, with the at least one segment having the at least one presentation component populated with public information; and augment the image of the private information with one of the stored received images of the public information, with the one of the stored images of the public information in juxtaposition with the image of the private information.

4. The system of claim 1, further configured to:
generate the first presentation component at run time by overlaying the retrieved private information on the presentation template according to tags associated with the segment.

5. The system of claim 1 wherein the device and the one or more devices each includes a display device.

6. The system of claim 5 wherein the display device is a set of eyeglasses comprising a pair display device elements, the eyeglasses configured to receive the generated image.

7. The system of claim 5 wherein the display device is a set of eyeglasses comprising a pair display device elements, the eyeglasses configured to receive the generated image over a wireless connection.

8. The system of claim 1, further comprising:
a portable computing system including:
a wireless connection configured to receive the generated image; and
a set of eyeglasses comprising a pair display device elements, the eyeglasses configured to receive the generated image over the wireless connection of the portable computing system.

9. The system of claim 1, wherein the one or more computer systems are further configured to:
receive, from the computer system associated with the particular user, information uniquely identifying the particular user as authenticated to access at least a portion of private information;
verify, based on the information uniquely identifying the particular user, that the particular user is authenticated to access the portion of the private information; and
establish a secure connection between the device associated with the particular user and the one or more computer systems, with the private information sent to the device of the particular user over the secure connection.

10. The system of claim 1, wherein the one or more computer systems are further configured to:
generate a pictorial representation of a physical display board; and
integrate the image of the private information with the pictorial representation of the physical display board.

11. The system of claim 1 further configured to:
receive from systems associated plural users at a public seminar, requests for the presentation component populated with corresponding private information associated with respective ones of the plural users; and
send to the systems associated with the users versions of the images of the populated with the private information corresponding to the users authenticated to receive the private information.

12. The system of claim 1 further configured to:
generate a plurality of independent information feeds comprising the generated images, each feed comprising private information related to one of a plurality of users and presentation information associated with the presentation component of the live presentation.

13. A computer implemented method, the method comprising:
receiving by one or more computer systems an indication of a start of a segment of a live presentation, the live presentation comprising at least one segment, with the at least one segment having at least one presentation component;
retrieving by the one or more computer systems, one or more sets of private information associated with at least some of the plurality of users;
analyzing by one or more computer systems a particular set of private, retrieved information of a particular user to select from the particular set of private information selected private information relevant to the at least one presentation component of the at least one segment of the live presentation;
generating by the one or more computers a first version of the presentation component, which is specific to the particular user from a presentation component template and the selected private information of the particular user;
generating by one or more computer systems a first image corresponding to the generated presentation component specific to the particular user, the image having at least some of the selected private information of the particular user;
generating by the one or more computers a second version of the presentation component for the plurality of users from the presentation component template and generic information;
generating by the one or more computers a second image corresponding to the generated second version of the presentation component for the plurality of users excluding the particular user; and
sending the generated first image including the private information to a device associated with the particular user and the generated second image that includes generic information to one or more devices associated with one or more users excluding the particular user.

14. The method of claim 13, wherein retrieving, retrieves plural sets including the one set of private information, and the method further comprises:
analyzing by the one or more computers, the retrieved plural sets of private information of plural users that are included in the plurality of users, to select from the plural sets of private information of the plural users, including the particular user, private information relevant to the at least one presentation component of the at least one segment of the live presentation;
generating by the one or more computers, plural first versions of the presentation component including the first generated presentation component from the presentation component template each of the plural first versions specific to a corresponding one of the plural users;
generating by the one or more computers corresponding images for each of the plural versions of the first presentation component for the plural users, with each one of the corresponding image populated with the private information pertaining to a corresponding one of the plural users including the particular user; and
sending by the one or more computers the generated images to devices associated with the plurality of users.

15. The method of claim 13, further comprising:
receiving from a video recording device images captured from the live presentation;

storing the received images captured from the live, with the at least one segment having the at least one presentation component populated with public information; and augmenting the image of the private information with one of the stored received images of the public information, with the one of the stored images of the public information in juxtaposition with the image of the private information.

16. The method of claim 13, further comprising:

receiving, from a computer system associated with the particular user, information uniquely identifying the particular user as authenticated to access at least a portion of private information;

verifying, based on the information uniquely identifying the particular user, that the particular user is authenticated to access the portion of the private information; and establishing a secure connection between the device associated with the particular user and the one or more computer systems, with the private information sent to the device of the particular user over the secure connection.

17. The method of claim 13, further comprising:

generating a pictorial representation of a physical display board; and integrating the image of the private information with the pictorial representation of the physical display board.

18. The method of claim 13, further comprising:

receiving from systems associated with plural users at a public seminar, requests for the live presentation having presentation components populated with corresponding private information associated with respective ones of the plural users; and sending to the systems associated with the users images of the segment populated with the private information corresponding to the users authenticated to receive the private information.

19. The method of claim 13, further comprising:

generating a plurality of independent information feeds comprising generated images, each feed comprising private information related to one of a plurality of users and presentation information associated with the presentation component of the live presentation.

20. A computer program product tangibly stored on one or more computer-readable hardware storage devices, the computer program product comprising instructions that are executable by the one or more processing devices to:

receive an indication of a start of a segment of a live presentation, the live presentation comprising at least one segment, with the at least one segment having at least one presentation component;

retrieve one or more sets of private information associated with at least some of a plurality of users;

apply rules to extract from a particular set of the retrieved private information associated with a particular user, selected private information of the particular user, which is relevant to the at least one presentation component;

generate a first version of the presentation component, which is specific to the particular user from a presentation component template and the selected private information of the particular user;

generate a first image corresponding to the generated first version of the presentation component specific to the particular user, the first version of the image having at least some of the selected private information of the particular user;

generate a second version of the presentation component, which is for the plurality of users excluding the particular user, from the presentation component template and generic information;

generate a second image corresponding to the generated second version of the presentation component for the plurality of users excluding the particular user; and send the generated first image including the private information to a device associated with the particular user and the generated second image that includes generic information to one or more devices associated with the plurality of users excluding the particular user.

21. The computer program product of claim 20 wherein the instructions to retrieve, retrieves plural sets including the one set of private information, the product further comprising instructions to:

apply the rules to analyze the retrieved, plural sets of private information of plural users that are included in the plurality of users, to select from the plural sets of private information of the plural users including the particular user, information relevant to the at least one presentation component;

generate plural first versions of the presentation component including the first generated presentation component from the presentation component template each of the plural first versions specific to a corresponding one of the plural users;

generate corresponding images for each of the plural versions of the first presentation component for the plural users with each one of the corresponding image populated with the private information pertaining to a corresponding one of the plural users, and for remaining users of the plurality of users, the images populated with generic non-private, fill in information for that presentation component; and send the generated images to devices associated with the plurality of users.

22. The computer program product of claim 20 further comprising instructions to:

receive from a video recording device images captured from the live presentation;

store the received images captured from the live presentation, with the at least one segment having the at least one presentation component populated with public information; and augment the image of the private information with one of the stored received images of the public information, with the one of the stored images of the public information in juxtaposition with the image of the private information.

23. The computer program product of claim 20 further comprising instructions to:

receive the generated image.

24. The computer program product of claim 20 wherein the display device configured to receive the generated image is physically remote from the one or more computer systems.

25. The computer program product of claim 20 wherein the display device is a set of eyeglasses comprising a pair display device elements, the eyeglasses configured to receive the generated image.

26. The computer program product of claim 20 further comprising instructions to:

receive, from a computer system associated with the particular user, information uniquely identifying the particular user as authenticated to access at least a portion of private information;

verify, based on the information uniquely identifying the particular user, that the particular user is authenticated to access the portion of the private information; and establish a secure connection between the device associated with the particular user and the one or more computer systems, with the private information sent to the device of the particular user over the secure connection.

27. The computer program product of claim 20 further comprising instructions to:

generate a pictorial representation of a physical display board; and integrate the image of the private information with the pictorial representation of the physical display board.

28. The computer program product of claim 20 further comprising instructions to:

receive from computer systems associated plural users at a public seminar, requests for the live presentation having presentation components populated with corresponding private information associated with respective ones of the plural users; and send to the systems associated with the users images of the segment populated with the private information corresponding to the users authenticated to receive the private information.

29. The computer program product of claim 20 further comprising instructions to:

generate a plurality of independent information feeds comprising generated images, each feed comprising private information related to one of a plurality of users and presentation information associated with the presentation component of the live presentation.

30. The system of claim 1 wherein the system configured to retrieve, is further configured to:

retrieve the one or more sets private information from a database that stores user account information that comprises financial information of the at least some of the plurality of users.

31. The method of claim 13 wherein retrieving further comprises:

retrieving the one or more sets private information from a database that stores user account information that comprises financial information of the at least some of the plurality of users.

32. The computer program product of claim 20 wherein the instructions to retrieve, comprise instructions to:

retrieve the one or more sets private information from a database that stores user account information that comprises financial information of the at least some of the plurality of users.

* * * * *